US011604986B2

(12) United States Patent
Amisano et al.

(10) Patent No.: US 11,604,986 B2
(45) Date of Patent: Mar. 14, 2023

(54) BLOCKCHAIN-ENABLED DECENTRALIZED ECOSYSTEM FOR SECURE TRAINING OF DEEP NEURAL NETWORKS USING TRUSTED EXECUTION ENVIRONMENTS

(71) Applicant: International Business Machines Corporation, Armonk, NY (US)

(72) Inventors: Michael Amisano, East Northport, NY (US); John Behnken, Hurley, NY (US); Jeb R. Linton, Manassas, VA (US); John Melchionne, Kingston, NY (US); David K. Wright, Monroe, MI (US); Dennis Kramer, Siler City, NC (US)

(73) Assignee: International Business Machines Corporation, Armonk, NY (US)

( * ) Notice: Subject to any disclaimer, the term of this patent is extended or adjusted under 35 U.S.C. 154(b) by 439 days.

(21) Appl. No.: 16/804,076

(22) Filed: Feb. 28, 2020

(65) Prior Publication Data
US 2021/0271963 A1  Sep. 2, 2021

(51) Int. Cl.
*G06N 3/08* (2006.01)
*G06F 21/57* (2013.01)
(Continued)

(52) U.S. Cl.
CPC .............. *G06N 3/08* (2013.01); *G06F 21/57* (2013.01); *H04L 9/0637* (2013.01); *H04L 9/0643* (2013.01); *H04L 9/50* (2022.05)

(58) Field of Classification Search
CPC  G06N 3/08; G06F 21/57; G06F 21/53; H04L 9/0637; H04L 9/0643; H04L 9/50; H04L 63/0428; H04L 9/3239
See application file for complete search history.

(56) References Cited

U.S. PATENT DOCUMENTS 10,095,992 B1 * 10/2018 Brestoff ................... G06N 3/04
10,565,498 B1 *  2/2020 Zhiyanov ............... G06N 7/005
(Continued)

FOREIGN PATENT DOCUMENTS

CN    110211683 A    7/2018
CN    109698822 A    4/2019
(Continued)

OTHER PUBLICATIONS

Chang et al., "Ekiden: A Platform for Confidentiality-Preserving, Trustworthy, and Performant Smart Contracts," 2019 IEEE European Symposium on Security and Privacy (EuroS&P), Jun. 2019, Stockholm, Sweden, 20 pages. https://arxiv.org/pdf/1804.05141.pdf.

(Continued)

*Primary Examiner* — Taghi T Arani
*Assistant Examiner* — Blake I Narramore
(74) *Attorney, Agent, or Firm* — Yee & Associates, P.C.

(57) ABSTRACT

Training a deep neural network model using a trusted execution environment is provided. A selection of two or more encrypted files owned by different entities within a plurality of encrypted files containing sensitive datasets is made by a user of a client device. The two or more encrypted files owned by the different entities are decrypted within the trusted execution environment to form decrypted sensitive datasets owned by the different entities. The decrypted sensitive datasets owned by the different entities are combined within the trusted execution environment to form combined sensitive data owned by the different entities. The deep neural network model is generated within the trusted execution environment based on the combined sensitive data owned by the different entities. The deep neural network model is trained within the trusted execution environment (Continued)

using the combined sensitive data owned by the different entities.

20 Claims, 5 Drawing Sheets

(51) Int. Cl.
*H04L 9/06* (2006.01)
*H04L 9/00* (2022.01)

(56) References Cited

U.S. PATENT DOCUMENTS

| | | | |
|---|---|---|---|
| 10,600,067 B2* | 3/2020 | Tiell | G06Q 30/0201 |
| 2019/0042937 A1* | 2/2019 | Sheller | G06N 3/08 |
| 2020/0082270 A1* | 3/2020 | Gu | G06N 3/0427 |
| 2020/0250780 A1* | 8/2020 | Spangenberg | G06N 3/0427 |
| 2020/0289077 A1* | 9/2020 | Bai | A61B 6/037 |
| 2021/0014247 A1* | 1/2021 | Wosotowsky | G06N 20/00 |
| 2021/0114215 A1* | 4/2021 | Jeong | B25J 13/003 |
| 2021/0117395 A1* | 4/2021 | Wang | G06N 20/00 |
| 2021/0173583 A1* | 6/2021 | Kale | G06N 3/063 |
| 2021/0192360 A1* | 6/2021 | Bitauld | H04L 63/04 |
| 2021/0211291 A1* | 7/2021 | Jindal | G06F 7/5443 |
| 2021/0250166 A1* | 8/2021 | Sundaresan | H04L 63/0428 |

FOREIGN PATENT DOCUMENTS

| | | |
|---|---|---|
| CN | 110046891 A | 7/2019 |
| CN | 110197285 A | 9/2019 |
| CN | 110210245 A | 9/2019 |
| WO | WO2018126065 A1 | 7/2018 |
| WO | WO2019073000 A1 | 4/2019 |

OTHER PUBLICATIONS

Tramer et al., "Slalom: Fast, Verifiable and Private Execution of Neural Networks in Trusted Hardware," Published as a conference paper at ICLR 2019,19 pages. https://arxiv.org/pdf/1806.03287.pdf.

* cited by examiner

BLOCKCHAIN-ENABLED DECENTRALIZED ECOSYSTEM FOR SECURE TRAINING OF DEEP NEURAL NETWORKS USING TRUSTED EXECUTION ENVIRONMENTS

BACKGROUND

1. Field

The disclosure relates generally to blockchains and more specifically to providing a blockchain-enabled decentralized ecosystem for secure training of deep neural networks using trusted execution environments.

2. Description of the Related Art

A blockchain exists as a shared and continuously reconciled database. The distribution and reconciliation of the database can be done automatically, by time, by some internal or extrinsic event, or by other criteria. In each case, a blockchain is a continuously growing chain of data blocks, which are linked and secured using cryptography. Each block typically contains a cryptographic hash of the previous block in the blockchain, as well as a timestamp and data corresponding to an event, such as a transaction, operational event, or an output event called a "smart contract". The cryptographic hash of the previous block in the blockchain, links the two blocks. The linked blocks form the blockchain. Blocks are appended in chronological order. In other words, the last block in the chain is the most recent block. Further, blocks are immutable (i.e., cannot be changed or deleted).

By design, a blockchain is resistant to modification of the data. For use as a distributed, decentralized ledger (i.e., not stored in just one central network node), a blockchain is typically managed by a network of nodes collectively adhering to a protocol for validating new blocks. Each node connected to, or connecting to, the network receives a copy of the blockchain, which is downloaded automatically. Once recorded, the data in any given block cannot be altered retroactively without the alteration of all subsequent blocks.

Thus, decentralized consensus is achieved using a blockchain. This decentralized consensus makes blockchains suitable for the recording of data provenance, events, medical records, identity management, financial transaction processing, and the like. In addition, a blockchain can assign rights because the blockchain provides a record that compels offer and acceptance.

Blockchain-based smart contracts are computer-generated legal contracts that can be partially or fully executed or enforced without human interaction. In other words, a smart contract is a computer protocol that digitally facilitates, verifies, or enforces negotiation or performance of a contract. The blockchain-based smart contract is enabled by programming instructions that define and execute an agreement. The blockchain-based smart contract can write, record, or effect a financial or other transaction, and/or conduct a real-world operation.

SUMMARY

According to one illustrative embodiment, a computer-implemented method for training a deep neural network model using a trusted execution environment is provided. A computer receives a selection of two or more encrypted files owned by different entities within a plurality of encrypted files containing sensitive datasets by a user of a client device. The computer, using the trusted execution environment, decrypts the two or more encrypted files owned by the different entities within the trusted execution environment to form decrypted sensitive datasets owned by the different entities. The computer, using the trusted execution environment, combines the decrypted sensitive datasets owned by the different entities within the trusted execution environment to form combined sensitive data owned by the different entities. The computer, using the trusted execution environment, generates the deep neural network model within the trusted execution environment based on the combined sensitive data owned by the different entities. The computer, using the trusted execution environment, trains the deep neural network model using the combined sensitive data owned by the different entities to form a trained deep neural network model within the trusted execution environment based on the combined sensitive data owned by the different entities. According to other illustrative embodiments, a computer system and computer program product for training a deep neural network model using a trusted execution environment are provided.

DETAILED DESCRIPTION

Figure 1:
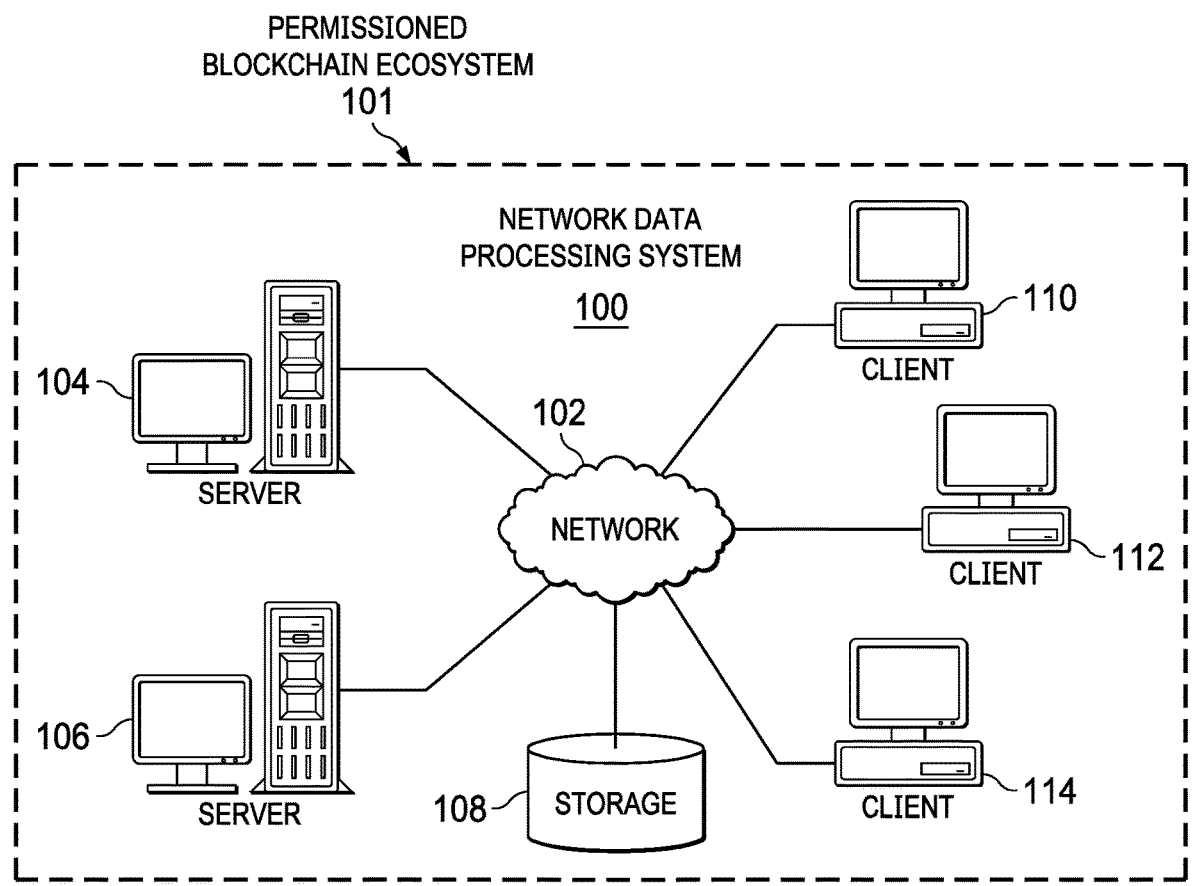
FIG. 1 is a pictorial representation of a network of data processing systems in which illustrative embodiments may be implemented.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
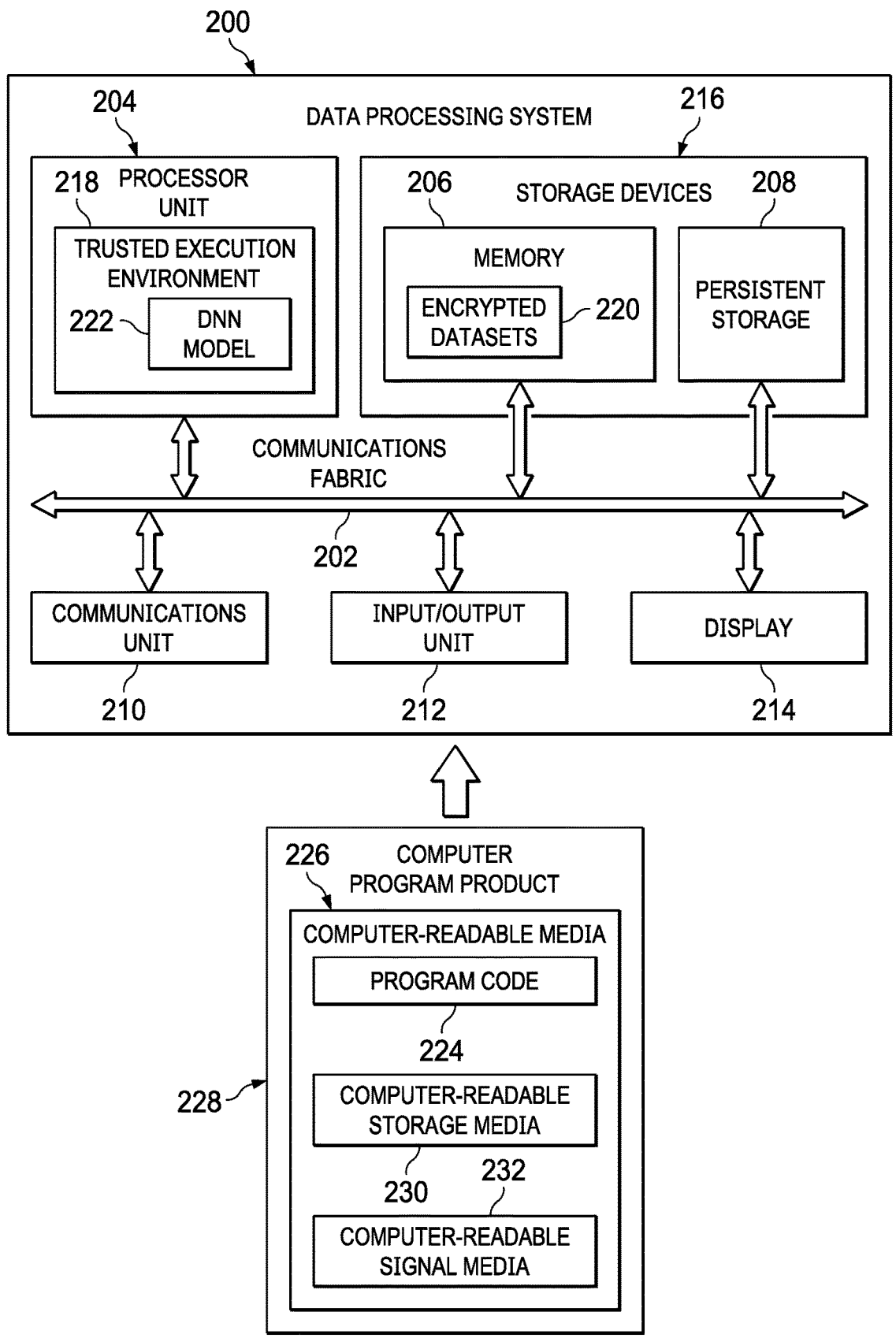
FIG. 2 is a diagram of a data processing system in which illustrative embodiments may be implemented.
Figure 3:
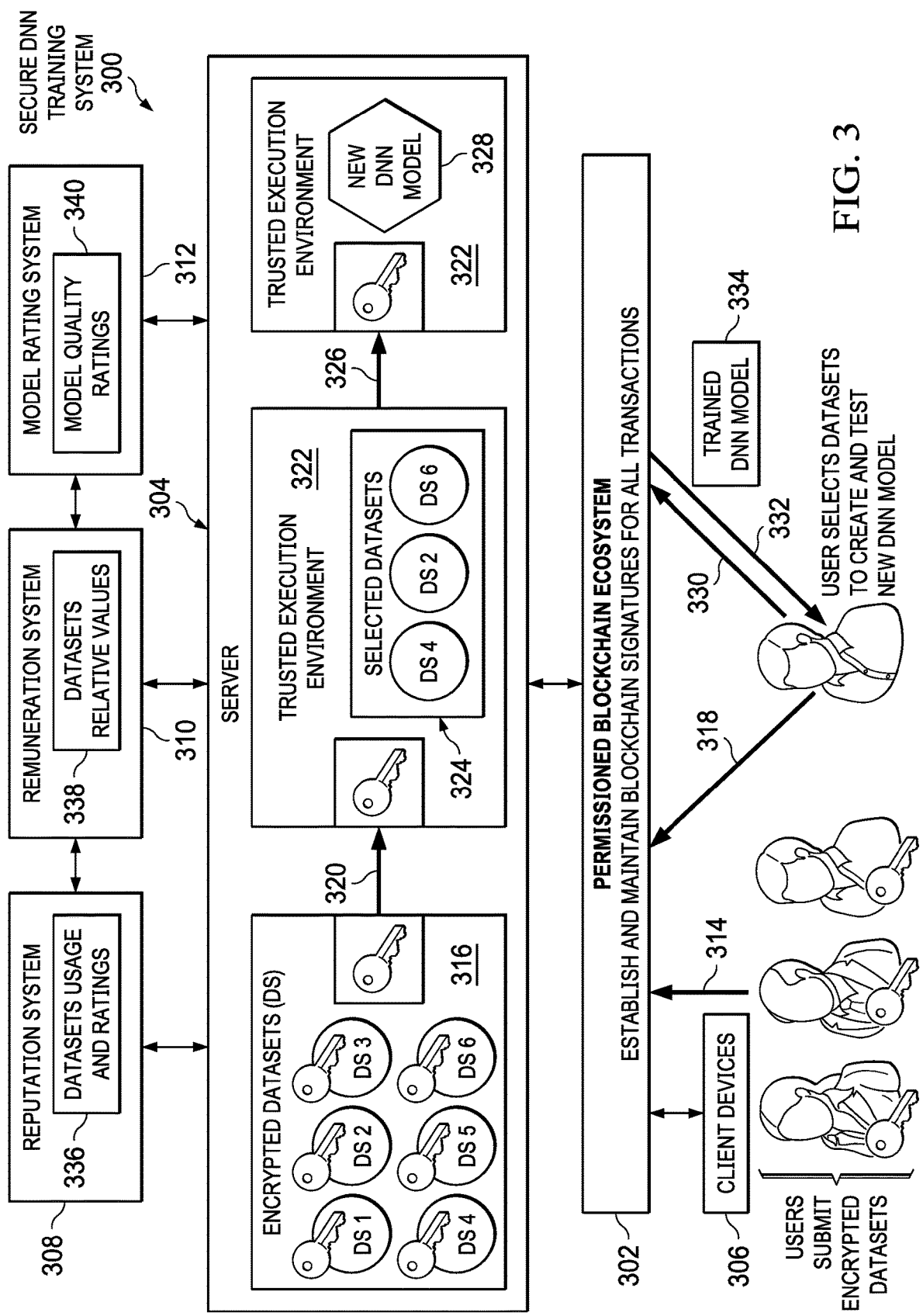
FIG. 3 is a diagram illustrating an example of a secure deep neural network training system in accordance with an illustrative embodiment.

With reference now to the figures, and in particular, with reference to FIGS. 1-3, diagrams of data processing environments are provided in which illustrative embodiments may be implemented. It should be appreciated that FIGS. 1-3 are only meant as examples and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers, data processing systems, and other devices in which the illustrative embodiments may be implemented. In addition, network data processing system 100 comprises permissioned blockchain ecosystem 101. In other words, each node of network data processing system 100 is an authorized member of permissioned blockchain ecosystem 101. Permissioned blockchain ecosystem 101 may be, for example, a distributed secure ledger fabric that utilizes cryptography to immutably record transactions between nodes of network data processing system 100.

Network data processing system 100 contains network 102, which is the medium used to provide communications links between the computers, data processing systems, and other devices connected together within network data processing system 100. Network 102 may include connections, such as, for example, wire communication links, wireless communication links, fiber optic cables, and the like.

In the depicted example, server 104 and server 106 connect to network 102, along with storage 108. Server 104 and server 106 may be, for example, server computers with high-speed connections to network 102. In addition, server 104 and server 106 can provide secure deep neural network training services to registered client devices.

A deep neural network is a deep learning architecture with a certain level of complexity (i.e., a neural network with more than two layers). Deep neural networks use sophisticated mathematical modeling to process data in complex ways. In general, a deep neural network simulates human brain activity using pattern recognition by passing input through multiple layers of simulated neural connections. Typically, deep neural networks have an input layer, an output layer, and at least one hidden layer in between the input and output layers. Each layer performs specific types of sorting and ordering. Deep neural networks are capable of processing unlabeled or unstructured data.

Server 104 and server 106 utilize trusted execution environments to decrypt and combine sensitive datasets received from registered client devices corresponding to a plurality of different entities to train deep neural network models using the combined sensitive datasets, while maintaining security and privacy of sensitive data belonging to each respective entity by keeping the sensitive data within the trusted execution environments. In other words, the client devices corresponding to the entities do not have access to the sensitive datasets within the trusted execution environments.

Also, it should be noted that server 104 and server 106 may each represent a cluster of servers in one or more data centers. Alternatively, server 104 and server 106 may each represent multiple computing nodes in one or more cloud environments.

Client 110, client 112, and client 114 also connect to network 102. Clients 110, 112, and 114 are registered clients of server 104 and server 106. In this example, clients 110, 112, and 114 are shown as desktop or personal computers with wire communication links to network 102. However, it should be noted that clients 110, 112, and 114 are examples only and may represent other types of data processing systems, such as, for example, network computers, laptop computers, handheld computers, smart phones, smart televisions, and the like, with wire or wireless communication links to network 102. Users of clients 110, 112, and 114 may utilize clients 110, 112, and 114 to access and utilize the secure deep neural network training services provided by server 104 and server 106.

Storage 108 is a network storage device capable of storing any type of data in a structured format or an unstructured format. In addition, storage 108 may represent a plurality of network storage devices corresponding to a plurality of different entities. Further, storage 108 may store one or more sensitive datasets corresponding to the entity that owns and operates storage 108. A sensitive dataset may include, for example, network security data, healthcare data, financial data, transaction data, or the like, which corresponds to that particular entity. Furthermore, storage 108 may store other types of data, such as authentication or credential data that may include user names, passwords, and biometric templates associated with the client device users corresponding to that particular entity.

In addition, it should be noted that network data processing system 100 may include any number of additional servers, clients, storage devices, and other devices not shown. Program code located in network data processing system 100 may be stored on a computer readable storage medium and downloaded to a computer or other data processing device for use. For example, program code may be stored on a computer readable storage medium on server 104 and downloaded to client 110 over network 102 for use on client 110.

In the depicted example, network data processing system 100 may be implemented as a number of different types of communication networks, such as, for example, an internet, an intranet, a local area network (LAN), a wide area network (WAN), a telecommunications network, or any combination thereof. FIG. 1 is intended as an example only, and not as an architectural limitation for the different illustrative embodiments.

With reference now to FIG. 2, a diagram of a data processing system is depicted in accordance with an illustrative embodiment. Data processing system 200 is an example of a server computer, such as server 104 in FIG. 1, in which computer readable program code or instructions implementing secure deep neural network training processes of illustrative embodiments may be located. In this example, data processing system 200 includes communications fabric 202, which provides communications between processor unit 204, memory 206, persistent storage 208, communications unit 210, input/output (I/O) unit 212, and display 214.

Processor unit 204 serves to execute instructions for software applications and programs that may be loaded into memory 206. Processor unit 204 may be a set of one or more hardware processor devices or may be a multi-core processor, depending on the particular implementation.

Further, processor unit 204 includes trusted execution environment 218. Trusted execution environment 218 is a secure area of processor unit 204. Furthermore, trusted execution environment 218 is separate from, and runs parallel with, the operating system of data processing system 200. Trusted execution environment 218 guarantees that applications and data loaded inside of trusted execution environment 218 are protected with respect to confidentiality and integrity. Trusted execution environment 218 generates and holds a private encryption key that is only used within trusted execution environment 218, with no opportunity for eavesdropping. Trusted execution environment 218, utilizing a private key sharing protocol, may share the private key with other trusted execution environments of other servers connected to a same permissioned blockchain ecosystem as data processing system 200, such as server 106 of permissioned blockchain ecosystem 101 in FIG. 1.

Trusted execution environment 218 has as an isolated execution environment, which provides security features, such as, for example, isolated execution, integrity of applications executing within the trusted execution environment, along with confidentiality of the applications' data. Trusted execution environment 218 is designed to prevent all software not signed by a public key corresponding to the private key held in trusted execution environment 218 from utilizing the security features.

Memory 206 and persistent storage 208 are examples of storage devices 216. A computer readable storage device is any piece of hardware that is capable of storing information, such as, for example, without limitation, data, computer readable program code in functional form, and/or other suitable information either on a transient basis or a persistent basis. Further, a computer readable storage device excludes a propagation medium. Memory 206, in these examples, may be, for example, a random-access memory (RAM), or any other suitable volatile or non-volatile storage device, such as a flash memory. Persistent storage 208 may take various forms, depending on the particular implementation. For example, persistent storage 208 may contain one or more devices. For example, persistent storage 208 may be a disk drive, a solid-state drive, a rewritable optical disk, a rewritable magnetic tape, or some combination of the above.

The media used by persistent storage 208 may be removable. For example, a removable hard drive may be used for persistent storage 208.

In this example, memory 206 stores encrypted datasets 220 in a secure portion of memory 206 that is dedicated to trusted execution environment 218. In other words, the secure portion of memory 206 that is dedicated to trusted execution environment 218 is only accessible by trusted execution environment 218. Encrypted datasets 220 represent a plurality of different sets of encrypted sensitive data, which are owned and submitted by a plurality of different entities for the purpose of training deep neural networks. The different entities, using a public key that corresponds to the private key held in trusted execution environment 218, encrypt encrypted datasets 220 prior to submitting encrypted datasets 220 to data processing system 200.

Trusted execution environment 218 utilizes the private key to decrypt the sensitive data contained in encrypted datasets 220. After decryption, trusted execution environment 218 may combine different sets of sensitive data corresponding to different entities to train deep neural network model 222. A user of a client device included in the same permissioned blockchain ecosystem can select which particular sets of sensitive data that the user wants to combine to train deep neural network model 222.

Subsequent to training deep neural network model 222 using the selected and combined sets of sensitive data owned by different entities, trusted execution environment 218 sends the trained deep neural network to the client device of the user for use. As a result, data processing system 200, by utilizing trusted execution environment 218, while training deep neural network model 222, maintains the security and privacy of each sensitive dataset in the combined sets of sensitive data owned by each respective entity.

After running the trained deep neural network, the user of the client device may send data processing system 200 feedback regarding the operation of the trained deep neural network. Data processing system 200 may utilize the feedback to, for example, retrain deep neural network 222. Data processing system 200 may also utilize input from other systems, such as, for example, a reputation system and a model rating system, to improve quality of encrypted datasets 220 and deep neural network 222. In addition, data processing system 200 may utilize a remuneration system to calculate payment to entities for submitted sensitive datasets to be used in the training of deep neural networks.

Communications unit 210, in this example, provides for communication with other computers, data processing systems, and devices via a network, such as network 102 in FIG. 1. Communications unit 210 may provide communications through the use of both physical and wireless communications links. The physical communications link may utilize, for example, a wire, cable, universal serial bus, or any other physical technology to establish a physical communications link for data processing system 200. The wireless communications link may utilize, for example, shortwave, high frequency, ultrahigh frequency, microwave, wireless fidelity (Wi-Fi), Bluetooth® technology, global system for mobile communications (GSM), code division multiple access (CDMA), second-generation (2G), third-generation (3G), fourth-generation (4G), 4G Long Term Evolution (LTE), LTE Advanced, fifth-generation (5G), or any other wireless communication technology or standard to establish a wireless communications link for data processing system 200.

Input/output unit 212 allows for the input and output of data with other devices that may be connected to data processing system 200. For example, input/output unit 212 may provide a connection for user input through a keypad, a keyboard, a mouse, a microphone, and/or some other suitable input device. Display 214 provides a mechanism to display information to a user and may include touch screen capabilities to allow the user to make on-screen selections through user interfaces or input data, for example.

Instructions for the operating system, applications, and/or programs may be located in storage devices 216, which are in communication with processor unit 204 through communications fabric 202. In this illustrative example, the instructions are in a functional form on persistent storage 208. These instructions may be loaded into memory 206 for running by processor unit 204. The processes of the different embodiments may be performed by processor unit 204 using computer-implemented instructions, which may be located in a memory, such as memory 206. These program instructions are referred to as program code, computer usable program code, or computer readable program code that may be read and run by a processor in processor unit 204. The program instructions, in the different embodiments, may be embodied on different physical computer readable storage devices, such as memory 206 or persistent storage 208.

Program code 224 is located in a functional form on computer readable media 226 that is selectively removable and may be loaded onto or transferred to data processing system 200 for running by processor unit 204. Program code 224 and computer readable media 226 form computer program product 228. In one example, computer readable media 226 may be computer readable storage media 230 or computer readable signal media 232.

In these illustrative examples, computer readable storage media 230 is a physical or tangible storage device used to store program code 224 rather than a medium that propagates or transmits program code 224. Computer readable storage media 230 may include, for example, an optical or magnetic disc that is inserted or placed into a drive or other device that is part of persistent storage 208 for transfer onto a storage device, such as a hard drive, that is part of persistent storage 208. Computer readable storage media 230 also may take the form of a persistent storage, such as a disk drive, a thumb drive, or a flash memory that is connected to data processing system 200.

Alternatively, program code 224 may be transferred to data processing system 200 using computer readable signal media 232. Computer readable signal media 232 may be, for example, a propagated data signal containing program code 224. For example, computer readable signal media 232 may be an electromagnetic signal, an optical signal, or any other suitable type of signal. These signals may be transmitted over communication links, such as wireless communication links, an optical fiber cable, a coaxial cable, a wire, or any other suitable type of communications link.

Further, as used herein, "computer readable media 226" can be singular or plural. For example, program code 224 can be located in computer readable media 226 in the form of a single storage device or system. In another example, program code 224 can be located in computer readable media 226 that is distributed in multiple data processing systems. In other words, some instructions in program code 224 can be located in one data processing system while other instructions in program code 224 can be located in one or more other data processing systems. For example, a portion of program code 224 can be located in computer readable media 226 in a server computer while another portion of program code 224 can be located in computer readable media 226 located in a set of client computers.

The different components illustrated for data processing system 200 are not meant to provide architectural limitations to the manner in which different embodiments can be implemented. In some illustrative examples, one or more of the components may be incorporated in or otherwise form a portion of, another component. For example, memory 206, or portions thereof, may be incorporated in processor unit 204 in some illustrative examples. The different illustrative embodiments can be implemented in a data processing system including components in addition to or in place of those illustrated for data processing system 200. Other components shown in FIG. 2 can be varied from the illustrative examples shown. The different embodiments can be implemented using any hardware device or system capable of running program code 224.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system.

Entities, such as, for example, organizations, enterprises, companies, businesses, agencies, institutions, and the like, making use of machine learning architectures would benefit from an ability to collect external or third-party data while guaranteeing privacy of the collected data. However, many artificial intelligence-based models fail because these models need to access sensitive data owned by other entities and lack the required privacy guarantee.

Illustrative embodiments enable federated deep neural network training on sensitive data received from a group of different entities who need their sensitive data to remain private (i.e., sensitive data of one entity remains undisclosed to other entities in the group). For example, a group of entities may wish to share sensitive network security data regarding cyberattacks for training deep neural networks corresponding to each of the entities in the group to better understand attack traffic and attack surface, while maintaining security and privacy of each entity's own sensitive network security data. As a result, the group of entities are able to increase learning of their deep neural networks by sharing information in a secure manner without divulging their own respective sensitive data to other entities in the group.

Each data contributor entity provides an encrypted file containing a sensitive dataset that can be decrypted in a centralized trusted execution environment of a server computer. The centralized trusted execution environment is capable of combining multiple datasets contained in the encrypted files and inputting the combined sensitive datasets into a deep neural network model for securely training the deep neural network model using the combined sensitive datasets.

For example, illustrative embodiments train a deep neural network using combined training datasets received from multiple external sources (i.e., data contributors). All data contributors encrypt their sensitive datasets prior to sending the sensitive datasets for deep neural network training purposes.

In a preferred illustrative embodiment, all trusted execution environments that perform deep neural network training share a private key. This shared private key only exists inside authorized trusted execution environments. For example, one trusted execution environment internally generates a public/private key pair and shares the private key with the other trusted execution environments according to a private key sharing protocol. No mechanism is provided to move the private key outside of the trusted execution environments under any circumstances.

When a data contributor wants to contribute sensitive data for deep neural network training purposes, the data contributor encrypts the sensitive data using the public key corresponding to the private key held in the trusted execution environment. In this way, the data contributor provides an encrypted file containing the sensitive dataset, which the trusted execution environment can decrypt using the private key and combine that dataset with one or more other sensitive datasets for input as training data to a deep neural network model. In an alternative illustrative embodiment, the training of the deep neural network model can be performed in a separate trusted execution environment. The separate trusted execution environment can be provided with encrypted training data via application programming interface calls between trusted execution environments.

Data contributors authenticate anonymously to a permissioned blockchain, such as, for example, a hyperledger fabric, using an attribute-based credentials authentication system. The attribute-based credentials authentication system is a cryptographic protocol suite that provides privacy-preserving authentication and transfer of certified attributes. In other words, the attribute-based credentials authentication system allows user authentication without divulging any sensitive data. Thus, no sensitive data is collected that needs to be protected, managed, and treated according to government regulations. The attribute-based credentials authentication system assigns and signs a random token to each endpoint node in the permissioned blockchain. Endpoint nodes use this signed token to authentication to the "dataset grouping" trusted execution environment. Endpoint nodes corresponding to data contributors encrypt their sensitive datasets into files before submitting these sensitive datasets to the trusted execution environment. Once submitted, each endpoint node records a transaction to the permissioned blockchain with a hash of the encrypted dataset file submitted and a timestamp corresponding to the submission.

In an alternative illustrative embodiment, the deep neural network model in the trusted execution environment can use symmetric key encryption for sensitive training data stored on disk. Optionally, the deep neural network model in the trusted execution environment may perform Stochastic grouping of the mini-batch sensitive training data.

Further, illustrative embodiments may utilize smart contracts on the permissioned blockchain to perform the deep neural network training. For example, the smart contract can place a program in the trusted execution environment to run the training of the deep neural network model. To ensure security of smart contracts on the permissioned blockchain during training of a deep neural network model, illustrative embodiments can send training datasets to a graphical processor unit in a homomorphically encrypted form. Homomorphic encryption is a form of encryption that allows computation on ciphertexts (i.e., computing over encrypted data without access to the private key). The result of such a computation remains encrypted. Thus, homomorphic encryption generates an encrypted result which, when decrypted, matches the result of the operations as if the operations had been performed on the plaintext. Homomorphic encryption can be used for privacy-preserving storage and computation. In highly regulated industries, such as healthcare, homomorphic encryption can be used to enable new services by removing privacy barriers inhibiting data sharing. For example, predictive analytics in healthcare can be hard to apply due to medical data privacy regulations (e.g., Health Insurance Portability and Accountability Act). However, if the predictive analytics can operate on encrypted data, data privacy concerns are diminished.

Furthermore, illustrative embodiments may utilize a reputation system, which preserves the privacy of data contributors, but accumulates metadata regarding the quality of datasets submitted by data contributors based on how often their corresponding datasets are used and/or a rating of the datasets by other data contributors. Moreover, illustrative embodiments may utilize a remuneration or royalty system, which is capable of determining relative value of various dataset submissions and allocate payment or royalties accordingly. The remuneration system may determine the relative value of a particular dataset based on, for example, the usage and rating information corresponding to that particular dataset provided by the reputation system.

Illustrative embodiments may also utilize a model rating system, which can test resulting trained deep neural network model for accuracy with and without a given dataset based on a new training data model. This testing can determine the relative contribution to model accuracy based on the inclusion of each individual dataset. In addition, illustrative embodiments can directly connect this model rating system with the reputation system and the remuneration system.

Thus, illustrative embodiments provide one or more technical solutions that overcome a technical problem with training deep neural networks using sensitive data owned by different entities, while maintaining security and privacy of the sensitive data. As a result, these one or more technical solutions provide a technical effect and practical application in the field of deep neural networks.

With reference now to FIG. 3, a diagram illustrating an example of a secure deep neural network training system is depicted in accordance with an illustrative embodiment. Secure deep neural network training system 300 may be implemented in a network of data processing systems included in a permissioned blockchain ecosystem, such as network data processing system 100 included in permissioned blockchain ecosystem 101 in FIG. 1. Secure deep neural network training system 300 is a system of hardware and software components for providing a blockchain-enabled decentralized ecosystem for secure training of deep neural network models using combined sensitive datasets, which are owned by different entities, within a trusted execution environment.

In this example, secure deep neural network training system 300 includes permissioned blockchain ecosystem 302, server 304, client devices 306, reputation system 308, remuneration system 310, and model rating system 312. However, it should be noted that secure deep neural network training system 300 is intended as an example only and not as a limitation on illustrative embodiments. In other words, secure deep neural network training system 300 may include more or fewer components than shown. For example, secure deep neural network training system 300 may exclude one or more of reputation system 308, remuneration system 310, and model rating system 312. Alternatively, secure deep neural network training system 300 may combine components, such as, for example, combining reputation system 308 and remuneration system 310 into one component. Further, secure deep neural network training system 300 may include additional servers and/or other components not shown.

Permissioned blockchain ecosystem 302 may be, for example, permissioned blockchain ecosystem 101 in FIG. 1. Permissioned blockchain ecosystem 302 establishes and maintains blockchain signatures for all transactions between authorized nodes corresponding to permissioned blockchain ecosystem 302, such as server 304 and client devices 306. Server 304 and client devices 306 may be, for example, server 104 and clients 110, 112, and 114 in FIG. 1.

At 314, users, which correspond to different entities in a group of entities, submit a plurality of different encrypted datasets to server 304 using client devices 306. The plurality of different encrypted datasets contains sensitive data owned by each of the different entities. The plurality of different encrypted datasets may be in the form of encrypted files containing the sensitive data. It should be noted that permissioned blockchain ecosystem 302 publishes the public cryptographic key corresponding to the private cryptographic key generated by trusted execution environment 322 of server 304 to client devices 306 for encrypting the sensitive data prior to submission. Permissioned blockchain ecosystem 302 records each of the submissions in a blockchain or hyperledger.

Server 304 stores the encrypted datasets submitted by the users as encrypted datasets (DS) 316 in a secure portion of memory dedicated to, or in a memory component of, trusted execution environment 322. In this example, encrypted datasets 316 include encrypted dataset 1, encrypted dataset 2, encrypted dataset 3, encrypted dataset 4, encrypted dataset 5, and encrypted dataset 6. However, encrypted datasets 316 may include any number of encrypted datasets.

At 318, a user, which is associated with an entity in the group of entities, selects a number of encrypted datasets, such as two or more, for trusted execution environment 322 to create and test a new deep neural model. In this example, the user selects encrypted dataset 4, encrypted dataset 2, and encrypted dataset 6. Permissioned blockchain ecosystem 302 records the selections in the blockchain.

At 320, trusted execution environment 322 retrieves selected datasets 324 (i.e., encrypted dataset 4, encrypted dataset 2, and encrypted dataset 6 selected by the user). It should be noted that encrypted dataset 4, encrypted dataset 2, and encrypted dataset 6 are owned by different entities. Afterward, trusted execution environment 322 decrypts selected datasets 324 inside trusted execution environment 322 using the private cryptographic key held in trusted execution environment 322. Then, trusted execution environment 322 combines the decrypted sensitive data contained in selected datasets 324 to form combined sensitive data owned by different entities.

At 326, trusted execution environment 322 generates new deep neural network (DNN) model 328 based on the combined sensitive data of different entities contained in selected datasets 324. Further, trusted execution environment 322 inputs the combined sensitive data of the different entities contained in selected datasets 324 to train new deep neural network model 328.

However, it should be noted that in an alternative illustrative embodiment, the trusted execution environment that stores, decrypts, and combines sensitive datasets, is different from the trusted execution environment that generates and trains the deep neural network. The two trusted execution environments may communicate directly via application programming interface calls, for example.

At 330, the user that selected the datasets to create and test new deep neural network model 328, sends a request to trusted execution environment 322 for new deep neural network model 328 after training is complete. At 332, trusted execution environment 322 sends trained deep neural model 334, which is new deep neural network model 328 after training, to the client device of the user. Permissioned blockchain ecosystem 302 records the request for and the transmission of trained deep neural model 334 in the blockchain.

Server 304 may utilize reputation system 308 to generate usage and rating information corresponding to each respective dataset in encrypted datasets 316 to form datasets usage and ratings 336. Users of client devices 306 may use datasets usage and ratings 336 to select relevant and trustworthy data for creating and training deep neural networks.

Server 304 may also utilize remuneration system 310 to calculate relative values of each respective dataset in encrypted datasets 316 to form datasets relative values 338. Datasets relative values 338 may be based, at least in part, on datasets usage and ratings 336. Server 304 may use datasets relative values 338 to determine payment or royalties to entities for dataset submissions.

In addition, server 304 may utilize model rating system 312 to evaluate and measure accuracy of each trained deep neural network with and without a given dataset to form model quality ratings 340. Client device users can utilize model quality ratings 340 to determine the relative contribution of each individual dataset to model accuracy.

Figure 4A:
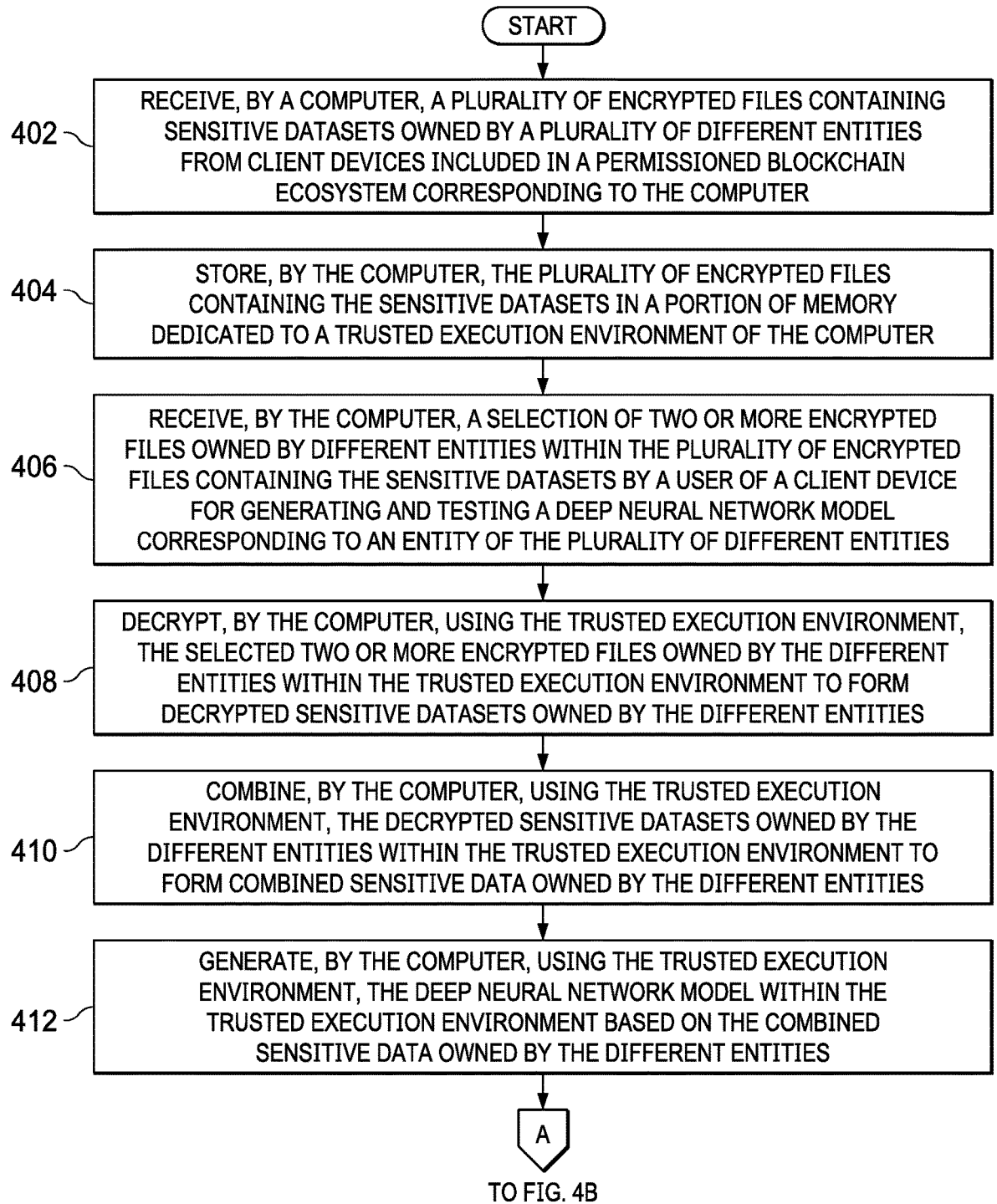
FIGS. 4A-4B are a flowchart illustrating a process for securely training deep neural network models in accordance with an illustrative embodiment.
Figure 4B:
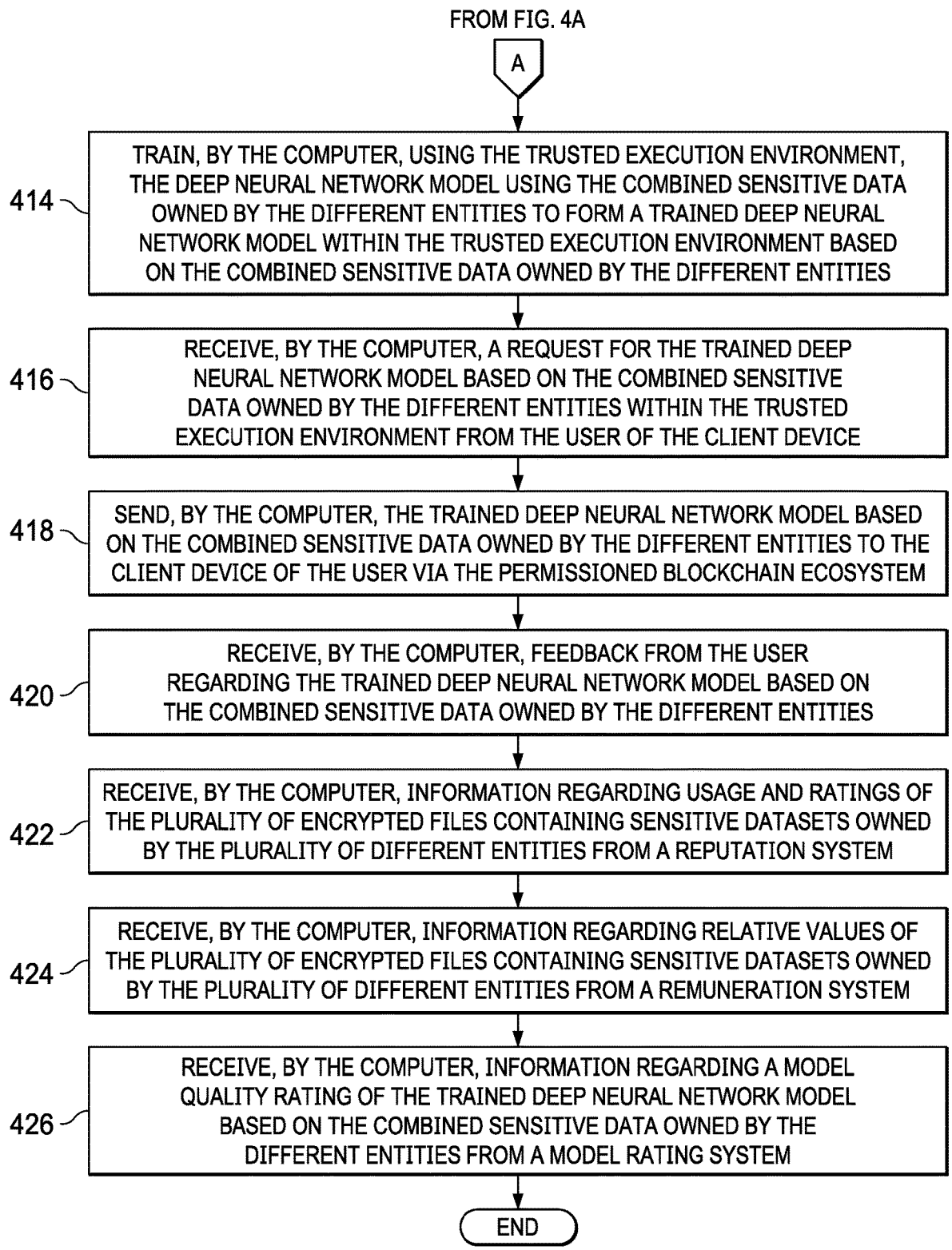

With reference now to FIGS. 4A-4B, a flowchart illustrating a process for securely training deep neural network models is shown in accordance with an illustrative embodiment. The process shown in FIGS. 4A-4B may be implemented in a computer, such as, for example, server 104 in FIG. 1, data processing system 200 in FIG. 2, or server 302 in FIG. 3.

The process begins when the computer receives a plurality of encrypted files containing sensitive datasets owned by a plurality of different entities from client devices included in a permissioned blockchain ecosystem corresponding to the computer (step 402). The computer stores the plurality of encrypted files containing the sensitive datasets in a portion of memory dedicated to a trusted execution environment of the computer (step 404).

The computer receives a selection of two or more encrypted files owned by different entities within the plurality of encrypted files containing the sensitive datasets by a user of a client device for generating and testing a deep neural network model corresponding to an entity of the plurality of different entities (step 406). The computer, using the trusted execution environment, decrypts the selected two or more encrypted files owned by the different entities within the trusted execution environment to form decrypted sensitive datasets owned by the different entities (step 408). The computer, using the trusted execution environment, combines the decrypted sensitive datasets owned by the different entities within the trusted execution environment to form combined sensitive data owned by the different entities (step 410).

The computer, using the trusted execution environment, generates the deep neural network model within the trusted execution environment based on the combined sensitive data owned by the different entities (step 412). The computer, using the trusted execution environment, trains the deep neural network model using the combined sensitive data owned by the different entities to form a trained deep neural network model within the trusted execution environment based on the combined sensitive data owned by the different entities (step 414).

The computer receives a request for the trained deep neural network model based on the combined sensitive data owned by the different entities within the trusted execution environment from the user of the client device (step 416). The computer sends the trained deep neural network model based on the combined sensitive data owned by the different entities to the client device of the user via the permissioned blockchain ecosystem (step 418).

Afterward, the computer receives feedback from the user regarding the trained deep neural network model based on the combined sensitive data owned by the different entities (step 420). In addition, the computer receives information regarding usage and ratings of the plurality of encrypted files containing the sensitive datasets owned by the plurality of different entities from a reputation system (step 422). Further, the computer receives information regarding relative values of the plurality of encrypted files containing the sensitive datasets owned by the plurality of different entities from a remuneration system (step 424). Furthermore, the computer receives information regarding a model quality rating of the trained deep neural network model based on the combined sensitive data owned by the different entities from a model rating system (step 426). Thereafter, the process terminates.

Thus, illustrative embodiments of the present invention provide a computer-implemented method, computer system, and computer program product for providing a blockchain-enabled decentralized ecosystem that utilizes trusted execution environments to decrypt and combine sensitive datasets submitted by registered client devices corresponding to a plurality of different entities to train deep neural network models using the combined sensitive datasets, while maintaining security and privacy of sensitive data belonging to each respective entity by keeping the sensitive data within the trusted execution environments. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for training a deep neural network model using a trusted execution environment, the computer-implemented method comprising:

receiving, by a computer, a selection of two or more encrypted files owned by different entities within a plurality of encrypted files containing sensitive datasets by a user of a client device;

decrypting, by the computer, using the trusted execution environment, the two or more encrypted files owned by the different entities within the trusted execution environment to form decrypted sensitive datasets owned by the different entities;

combining, by the computer, using the trusted execution environment, the decrypted sensitive datasets owned by the different entities within the trusted execution environment to form combined sensitive data owned by the different entities;

generating, by the computer, using the trusted execution environment, the deep neural network model within the trusted execution environment based on the combined sensitive data owned by the different entities; and training, by the computer, using the trusted execution environment, the deep neural network model using the combined sensitive data owned by the different entities to form a trained deep neural network model within the trusted execution environment based on the combined sensitive data owned by the different entities.

2. The computer-implemented method of claim 1 further comprising:
receiving, by the computer, a request for the trained deep neural network model based on the combined sensitive data owned by the different entities within the trusted execution environment from the user of the client device; and
sending, by the computer, the trained deep neural network model based on the combined sensitive data owned by the different entities to the client device of the user via a permissioned blockchain ecosystem.

3. The computer-implemented method of claim 1 further comprising:
receiving, by the computer, feedback from the user regarding the trained deep neural network model based on the combined sensitive data owned by the different entities, wherein the computer retrains the deep neural network model based on the feedback.

4. The computer-implemented method of claim 1 further comprising:
receiving, by the computer, information regarding a model quality rating of the trained deep neural network model based on the combined sensitive data owned by the different entities from a model rating system.

5. The computer-implemented method of claim 1 further comprising:
receiving, by the computer, the plurality of encrypted files containing the sensitive datasets owned by a plurality of different entities from client devices included in a permissioned blockchain ecosystem corresponding to the computer; and
storing, by the computer, the plurality of encrypted files containing the sensitive datasets in a portion of memory dedicated to the trusted execution environment of the computer.

6. The computer-implemented method of claim 5 further comprising:
receiving, by the computer, information regarding usage and ratings of the plurality of encrypted files containing the sensitive datasets owned by the plurality of different entities from a reputation system.

7. The computer-implemented method of claim 5 further comprising:
receiving, by the computer, information regarding relative values of the plurality of encrypted files containing the sensitive datasets owned by the plurality of different entities from a remuneration system.

8. A computer system for training a deep neural network model using a trusted execution environment, the computer system comprising:
a bus system;
a storage device connected to the bus system, wherein the storage device stores program instructions; and
a processor connected to the bus system, wherein the processor executes the program instructions to:
receive a selection of two or more encrypted files owned by different entities within a plurality of encrypted files containing sensitive datasets by a user of a client device;
decrypt, using the trusted execution environment, the two or more encrypted files owned by the different entities within the trusted execution environment to form decrypted sensitive datasets owned by the different entities;
combine, using the trusted execution environment, the decrypted sensitive datasets owned by the different entities within the trusted execution environment to form combined sensitive data owned by the different entities;
generate, using the trusted execution environment, the deep neural network model within the trusted execution environment based on the combined sensitive data owned by the different entities; and
train, using the trusted execution environment, the deep neural network model using the combined sensitive data owned by the different entities to form a trained deep neural network model within the trusted execution environment based on the combined sensitive data owned by the different entities.

9. The computer system of claim 8, wherein the processor further executes the program instructions to:
receive a request for the trained deep neural network model based on the combined sensitive data owned by the different entities within the trusted execution environment from the user of the client device; and
send the trained deep neural network model based on the combined sensitive data owned by the different entities to the client device of the user via a permissioned blockchain ecosystem.

10. The computer system of claim 8, wherein the processor further executes the program instructions to:
receive feedback from the user regarding the trained deep neural network model based on the combined sensitive data owned by the different entities, wherein the computer system retrains the deep neural network model based on the feedback.

11. The computer system of claim 8, wherein the processor further executes the program instructions to:
receive information regarding a model quality rating of the trained deep neural network model based on the combined sensitive data owned by the different entities from a model rating system.

12. The computer system of claim 8, wherein the processor further executes the program instructions to:
receive the plurality of encrypted files containing the sensitive datasets owned by a plurality of different entities from client devices included in a permissioned blockchain ecosystem corresponding to the computer; and
store the plurality of encrypted files containing the sensitive datasets in a portion of memory dedicated to the trusted execution environment of the computer system.

13. The computer system of claim 12, wherein the processor further executes the program instructions to:
receive information regarding usage and ratings of the plurality of encrypted files containing the sensitive datasets owned by the plurality of different entities from a reputation system.

14. A computer program product for training a deep neural network model using a trusted execution environment, the computer program product comprising a non-transitory computer readable storage medium having program instructions embodied therewith, the program instructions executable by a computer to cause the computer to perform a method comprising:
receiving, by the computer, a selection of two or more encrypted files owned by different entities within a plurality of encrypted files containing sensitive datasets by a user of a client device;
decrypting, by the computer, using the trusted execution environment, the two or more encrypted files owned by the different entities within the trusted execution environment to form decrypted sensitive datasets owned by the different entities;

combining, by the computer, using the trusted execution environment, the decrypted sensitive datasets owned by the different entities within the trusted execution environment to form combined sensitive data owned by the different entities;

generating, by the computer, using the trusted execution environment, the deep neural network model within the trusted execution environment based on the combined sensitive data owned by the different entities; and training, by the computer, using the trusted execution environment, the deep neural network model using the combined sensitive data owned by the different entities to form a trained deep neural network model within the trusted execution environment based on the combined sensitive data owned by the different entities.

15. The computer program product of claim 14 further comprising:

receiving, by the computer, a request for the trained deep neural network model based on the combined sensitive data owned by the different entities within the trusted execution environment from the user of the client device; and sending, by the computer, the trained deep neural network model based on the combined sensitive data owned by the different entities to the client device of the user via a permissioned blockchain ecosystem.

16. The computer program product of claim 14 further comprising:

receiving, by the computer, feedback from the user regarding the trained deep neural network model based on the combined sensitive data owned by the different entities, wherein the computer retrains the deep neural network model based on the feedback.

17. The computer program product of claim 14 further comprising:

receiving, by the computer, information regarding a model quality rating of the trained deep neural network model based on the combined sensitive data owned by the different entities from a model rating system.

18. The computer program product of claim 14 further comprising:

receiving, by the computer, the plurality of encrypted files containing the sensitive datasets owned by a plurality of different entities from client devices included in a permissioned blockchain ecosystem corresponding to the computer; and storing, by the computer, the plurality of encrypted files containing the sensitive datasets in a portion of memory dedicated to the trusted execution environment of the computer.

19. The computer program product of claim 18 further comprising:

receiving, by the computer, information regarding usage and ratings of the plurality of encrypted files containing the sensitive datasets owned by the plurality of different entities from a reputation system.

20. The computer program product of claim 18 further comprising:

receiving, by the computer, information regarding relative values of the plurality of encrypted files containing the sensitive datasets owned by the plurality of different entities from a remuneration system.

* * * * *